United States Patent
Chang et al.

(10) Patent No.: US 9,557,469 B2
(45) Date of Patent: *Jan. 31, 2017

(54) LIGHT GUIDE PLATE, BACKLIGHT MODULE AND DISPLAY DEVICE

(71) Applicant: Radiant Opto-Electronics Corporation, Kaohsiung (TW)

(72) Inventors: Chia-Yin Chang, Kaohsiung (TW); Chin-Ting Weng, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,591

(22) Filed: Oct. 21, 2015

(65) Prior Publication Data

US 2016/0041328 A1 Feb. 11, 2016

Related U.S. Application Data

(63) Continuation-in-part of application No. 13/751,166, filed on Jan. 28, 2013, now Pat. No. 9,223,079.

(30) Foreign Application Priority Data

Mar. 16, 2012 (TW) .............................. 101109144 A
Jun. 27, 2012 (TW) .............................. 101212386 U

(51) Int. Cl.
*F21V 7/04* (2006.01)
*F21V 8/00* (2006.01)

(52) U.S. Cl.
CPC ........... *G02B 6/0038* (2013.01); *G02B 6/0036* (2013.01); *G02B 6/0043* (2013.01); *G02B 6/0046* (2013.01); *G02B 6/0068* (2013.01); *G02B 6/002* (2013.01); *G02B 6/0016* (2013.01); *G02B 6/0028* (2013.01); *G02B 6/0033* (2013.01); *G02B 6/0035* (2013.01); *G02B 6/0045* (2013.01); *G02B 6/0055* (2013.01)

(58) Field of Classification Search
CPC ..... G02B 6/0016; G02B 6/002; G02B 6/0028; G02B 6/0033; G02B 6/0035; G02B 6/0036; G02B 6/0038; G02B 6/0045; G02B 6/0046; G02B 6/0048; G02B 6/0055
See application file for complete search history.

(56) References Cited

U.S. PATENT DOCUMENTS

| | | | | |
|---|---|---|---|---|
| 7,898,613 B2 * | 3/2011 | Jung et al. | ........... | G02B 6/0036 362/613 |
| 9,223,079 B2 * | 12/2015 | Chang et al. | ........... | G02B 6/004 |
| 2007/0064440 A1 * | 3/2007 | Liao | ..................... | G02B 6/0016 362/600 |

(Continued)

*Primary Examiner* — Y M Lee
(74) *Attorney, Agent, or Firm* — CKC & Partners Co., Ltd.

(57) ABSTRACT

A light guide plate and a backlight module are described. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface.

21 Claims, 16 Drawing Sheets

(56) References Cited

U.S. PATENT DOCUMENTS

| | | | |
|---|---|---|---|
| 2010/0195019 A1* | 8/2010 | Shinohara et al. | G02B 6/0016 362/611 |
| 2011/0103091 A1* | 5/2011 | Kunimochi et al. | G02B 6/0046 362/611 |
| 2011/0286238 A1* | 11/2011 | Kurata et al. | G02B 6/002 362/606 |
| 2014/0132887 A1* | 5/2014 | Kurata | G02B 6/0018 362/608 |

* cited by examiner

LIGHT GUIDE PLATE, BACKLIGHT MODULE AND DISPLAY DEVICE

RELATED APPLICATIONS

This application is a continuation-in-part application of U.S. application Ser. No. 13/751,166, filed on Jan. 28, 2013, which claims priority to Taiwan Application Serial Number 101109144, filed Mar. 16, 2012 and Taiwan Application Serial Number 101212386, filed Jun. 27, 2012, which are herein incorporated by reference.

FIELD OF THE INVENTION

The present invention relates to a light guide element and applications thereof, and more particularly to a light guide plate, a backlight module and a display device.

BACKGROUND OF THE INVENTION

As the rapid development of point light sources, such as light-emitting diodes (LEDs), a light source type of backlight modules is gradually changed from a linear light source type to a point light source type, for example from conventional linear cold-cathode fluorescent lamps (CCFLs) to point light-emitting diodes. Refer to FIG. 1 and FIG. 2. FIG. 1 and FIG. 2 respectively illustrate a top view of an arrangement of a light guide plate and light-emitting diodes and a side view of a conventional backlight module. A backlight module 100 mainly includes a light guide plate 102, a plurality of light-emitting diodes 108 and a cover 112.

In the backlight module 100, the light-emitting diodes 108 are disposed near a light incidence surface 106 of the light guide plate and emit light 110 toward the light incidence surface 106 of the light guide plate 102. The cover 112 covers the light-emitting diodes 108 and a portion of a light-emitting surface 104 on a light incidence side of the light guide plate 102, i.e. covers a non-visible region 118 of the light-emitting surface 104. Light 110 emitted by the light-emitting diodes 108 enters the light guide plate 102 through the light incidence surface 106, and is emitted out of the light guide plate 102 through the light-emitting surface 104 of the light guide plate 102 after being guided by the light guide plate 102.

Refer to FIG. 3. FIG. 3 illustrates a side view of another conventional backlight module. A structure of a backlight module 100a is substantially the same as that of the aforementioned backlight module 100, and a difference between the two structures is that a light guide plate 102a of the backlight module 100a includes a tapered portion 120 and a flat plate portion 122. A thickness of the tapered portion 120 is gradually lessened from the light incidence surface 106 toward the flat plate portion 122. In the backlight module 100a, expect for a top edge of the light incidence surface 106, distances between the light-emitting surface 104a of the light guide plate 102a and the cover 112 increase.

However, as shown in FIG. 2 and FIG. 3, if a covering range of the cover 112 is too short, an appearance light leakage phenomenon is very easy to form in the non-visible region 118 on the light incidence side of the backlight module 100 or 100a. In addition, the light-emitting diodes 108 are highly directional, so that an uneven brightness condition due to the light leakage in the non-visible region 118 of the backlight module 100 or 100a is very serious. Accordingly, eyes 114 of a user see that the backlight module 100 or 100a has poor appearance brightness uniformity and hot spots 116 usually formed on its light incidence side, such as shown in FIG. 4. Therefore, appearance brightness distribution of the conventional backlight modules 100 and 100a is uneven to seriously affect vision effects of the backlight modules 100 and 100a.

SUMMARY OF THE INVENTION

Therefore, one aspect of the present invention is to provide a light guide plate and a backlight module, in which a microstructure region of a light-emitting surface of the light guide plate near a light incidence surface is set with a plurality of stripe microstructures, which are parallel to a normal line of the light incidence surface. The stripe microstructures can scatter incident light of a non-visible region, so that leakage light on the non-visible region can be effectively blurred to greatly improve an uneven brightness phenomenon in the non-visible region.

Another aspect of the present invention is to provide a light guide plate and a backlight module, in which many dot microstructures are distributed in a microstructure region of the light guide plate near a light incidence surface and lengthwise crossing a light-emitting surface. The dot microstructures can blur light reflected back to a light-emitting surface of the light guide plate, so that a spray phenomenon caused by point light sources with high directionality can be greatly improved.

Still another aspect of the present invention is to provide a backlight module, which has emitted light of highly uniform.

According to the aforementioned aspects, the present invention provides a light guide plate. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface.

According to a preferred embodiment of the present invention, the stripe microstructures are a plurality of V-cut structures and/or a plurality of R-cut structures.

According to another preferred embodiment of the present invention, a central angle of each R-cut structure ranges from 60 degrees to 120 degrees.

According to still another preferred embodiment of the present invention, a flare angle of each V-cut structure ranges from 60 degrees to 120 degrees.

According to yet another preferred embodiment of the present invention, the stripe microstructures are closely adjacent to each other.

According to further another preferred embodiment of the present invention, a range of the microstructure region on the light-emitting surface is within 20 mm extending from the light incidence surface along the normal line of the light incidence surface.

According to still yet another preferred embodiment of the present invention, the main body is a flat plate with a uniform thickness.

According to still further another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to yet further another preferred embodiment of the present invention, the stripe microstructures are disposed on the tapered portion and/or the flat plate portion.

According to yet further another preferred embodiment of the present invention, the light guide plate further includes a plurality of microstructures disposed on the light reflective surface.

According to the aforementioned aspects, the present invention further provides a backlight module. The backlight module includes a light guide plate and a plurality of light sources. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface. The light sources are adjacent to the light incidence surface.

According to a preferred embodiment of the present invention, the stripe microstructures are a plurality of V-cut structures and/or a plurality of R-cut structures.

According to another preferred embodiment of the present invention, a central angle of each R-cut structure ranges from 60 degrees to 120 degrees.

According to still another preferred embodiment of the present invention, a flare angle of each V-cut structure ranges from 60 degrees to 120 degrees.

According to yet another preferred embodiment of the present invention, the stripe microstructures are closely adjacent to each other.

According to further another preferred embodiment of the present invention, a range of the microstructure region on the light-emitting surface is within 20 mm extending from the light incidence surface along the normal line of the light incidence surface.

According to still yet another preferred embodiment of the present invention, the main body is a flat plate with a uniform thickness.

According to still further another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to yet further another preferred embodiment of the present invention, the stripe microstructures are disposed on the tapered portion and/or the flat plate portion.

According to yet further another preferred embodiment of the present invention, the light guide plate further includes a plurality of microstructures disposed on the light reflective surface.

According to yet further another preferred embodiment of the present invention, the light sources are a plurality of light-emitting diodes.

According to the aforementioned aspects, the present invention further provides a light guide plate. The light guide plate includes a main body and a plurality of dot microstructures. The main body includes a light incidence surface, a light-emitting surface, a light reflective surface, a first side surface and a second side surface opposite to the first side surface. The light-emitting surface is opposite to the light reflective surface. The first side surface, the light incidence surface and the second side surface all are connected between the light-emitting surface and the light reflective surface. The light incidence surface is located between the first side surface and the second side surface. The light-emitting surface includes a microstructure region extending from the first side surface to the second side surface and separated from the light incidence surface by a distance. The dot microstructures are distributed in the whole microstructure region.

According to a preferred embodiment of the present invention, the main body is a flat plate with a uniform thickness.

According to another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to still another preferred embodiment of the present invention, the microstructure region is located on the flat plate portion.

According to yet another preferred embodiment of the present invention, a direction of the microstructure region extending from the first side surface to the second side surface is perpendicular to a normal line of the light incidence surface.

According to further another preferred embodiment of the present invention, the distance is greater than 0, and equal to or smaller than 20 mm.

According to the aforementioned aspects, the present invention further provides a backlight module. The backlight module includes a light guide plate, a plurality of light sources and a cover. The light guide plate includes a main body and a plurality of dot microstructures. The main body includes a light incidence surface, a light-emitting surface, a light reflective surface, a first side surface and a second side surface opposite to the first side surface. The light-emitting surface is opposite to the light reflective surface. The first side surface, the light incidence surface and the second side surface all are connected between the light-emitting surface and the light reflective surface. The light incidence surface is located between the first side surface and the second side surface. The light-emitting surface includes a microstructure region extending from the first side surface to the second side surface and separated from the light incidence surface by a distance. The dot microstructures are distributed in the whole microstructure region. The light sources are adjacent to the light incidence surface. The cover is disposed over the light sources, the light incidence surface and a portion of the light-emitting surface near the light incidence surface to reflect light emitted by the light sources to the light-emitting surface.

According to a preferred embodiment of the present invention, the main body is a flat plate with a uniform thickness.

According to another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along a normal line of the light incidence surface, in which a thickness of the flat plate portion is equal to the thickness of the second end.

According to still another preferred embodiment of the present invention, the microstructure region is located on the flat plate portion.

According to yet another preferred embodiment of the present invention, a direction of the microstructure region extending from the first side surface to the second side surface is perpendicular to a normal line of the light incidence surface.

According to further another preferred embodiment of the present invention, the distance is greater than 0, and equal to or smaller than 20 mm.

According to still yet another preferred embodiment of the present invention, the light sources are a plurality of light-emitting diodes.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

Figure 5:
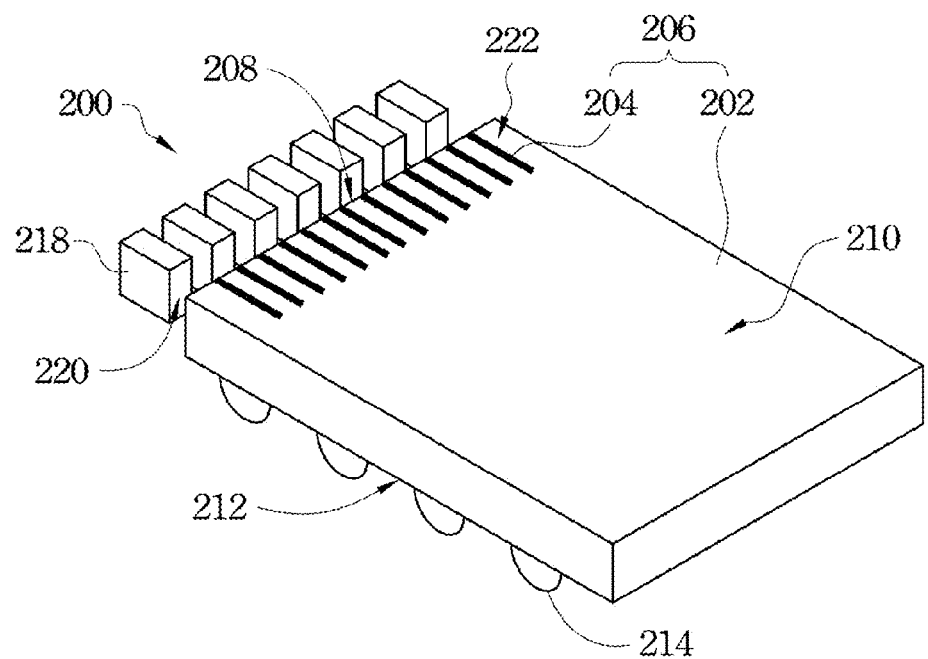
FIG. 5 illustrates a perspective view of a backlight module in accordance with an embodiment of the present invention.

Refer to FIG. 5. FIG. 5 illustrates a perspective view of a backlight module in accordance with an embodiment of the present invention. In the present embodiment, a backlight module 200 mainly includes a light guide plate 206 and a plurality of light sources 218. The light guide plate 206 includes a main body 202 and a plurality of stripe microstructures 204. In one exemplary example, the main body 202 may be a flat plate with a uniform thickness. The main body 202 may include a light incidence surface 208, a light-emitting surface 210 and a light reflective surface 212. In the main body 202, the light-emitting surface 210 and the light reflective surface 212 are on two opposite sides of the main body 202, and the light incidence surface 208 is connected between the light-emitting surface 210 and the light reflective surface 212. The light incidence surface 208 of the main body 202 may be a mirror surface or a surface having microstructures. In addition, the light-emitting surface 210 of the main body 202 may include a microstructure region 222 adjacent to the light incidence surface 208.

In the light guide plate 206, the stripe microstructures 204 are disposed in the microstructure region 222 of the light-emitting surface 210 of the main body 202. In one exemplary example, as shown in FIG. 5, the stripe microstructures 204 are arranged in the entire microstructure region 222 of the light-emitting surface 210. In one example, the stripe microstructures 204 are closely adjacent to each other. However, in another exemplary example, the stripe microstructures 204 arranged in the entire microstructure region 222 are not distributed in the entire microstructure region 222. An extending direction of each stripe microstructure 204 in the microstructure region 222 is parallel to a normal line of the light incidence surface 208. In one exemplary example, a range of the microstructure region 222 of the light-emitting surface 210 is within 20 mm extending from one end of the light-emitting surface, which is connected with the light incidence surface 208, along the normal line of the light incidence surface 208.

In some exemplary examples, the stripe microstructures 204 may be, for example, a plurality of V-cut structures and/or a plurality of R-cut structures. Central angles of the R-cut structures may range from 60 degrees to 120 degrees, for example. In addition, flare angles of the V-cut structures may range from 60 degrees to 120 degrees, for example. In one preferred example, the central angles of the R-cut structures or the flare angles of the V-cut structures are 100 degrees.

Refer to FIG. 5 again. The light sources 218 are disposed at a side of the light incidence surface 208, and adjacent to the light incidence surface 208. Light-emitting surfaces 220 of the light sources 218 are preferably opposite to the light incidence surface 208 of the light guide plate 206, so that the light sources 218 can emit light toward the light incidence surface 208. In one exemplary example, the light sources 218 may be point light sources, such as light-emitting diodes. The emitting light of the point light sources, such as the light-emitting diodes, is highly directional and narrow, and by arranging the stripe microstructures 204 within the microstructure region 222 of the light-emitting surface 210, the light emitted from the microstructure region 222 of the light-emitting surface 210 of the main body 202 can be scattered. Therefore, the leakage light on the light incidence side of the light guide plate 206 is uniformed to further uniform brightness of a light-emitting surface of the backlight module 200.

In some exemplary examples, the light guide plate 206 may further selectively include a plurality of microstructures 214 according to optical performance required by the backlight module 200. As shown in FIG. 5, the microstructures 214 may be arranged on the light reflective surface 212 of the main body 202 of the light guide plate 206. The microstructures 214 may be stripe structures, such as V-cut structures and R-cut structures, or may be taper structures or taper indentations.

Figure 6A:
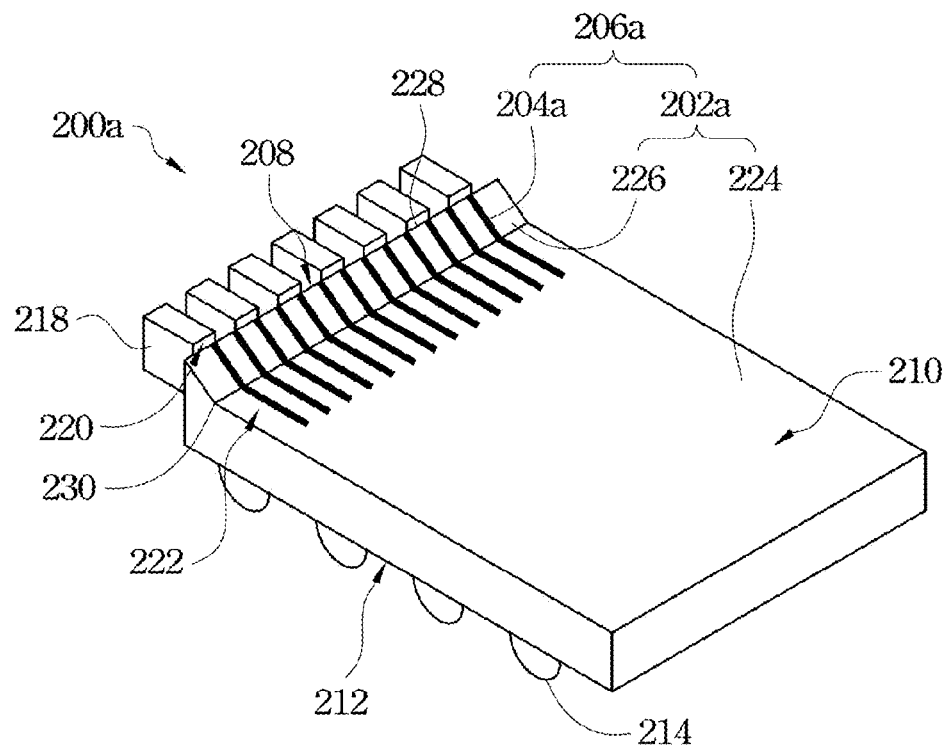
FIG. 6A illustrates a perspective view of a backlight module in accordance with another embodiment of the present invention.

The main body of the light guide plate of the present invention may not be a flat plate with a uniform thickness. Refer to FIG. 6A. FIG. 6A illustrates a perspective view of a backlight module in accordance with another embodiment of the present invention. A structure of a backlight module 200a of the present embodiment is substantially the same as that of the backlight module 200 of the aforementioned embodiment, and a difference between the two structures is that a main body 202a of a light guide plate 206a of the backlight module 200a is not a flat plate with a uniform thickness.

In the backlight module 200a, the light guide plate 206a includes a tapered portion 226 and a flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 extends on the tapered portion 226 and a portion of the flat plate portion 224, and the stripe microstructures 204a are disposed in the microstructure region 222 on the tapered portion 226 and the flat plate portion 224.

Figure 6B:
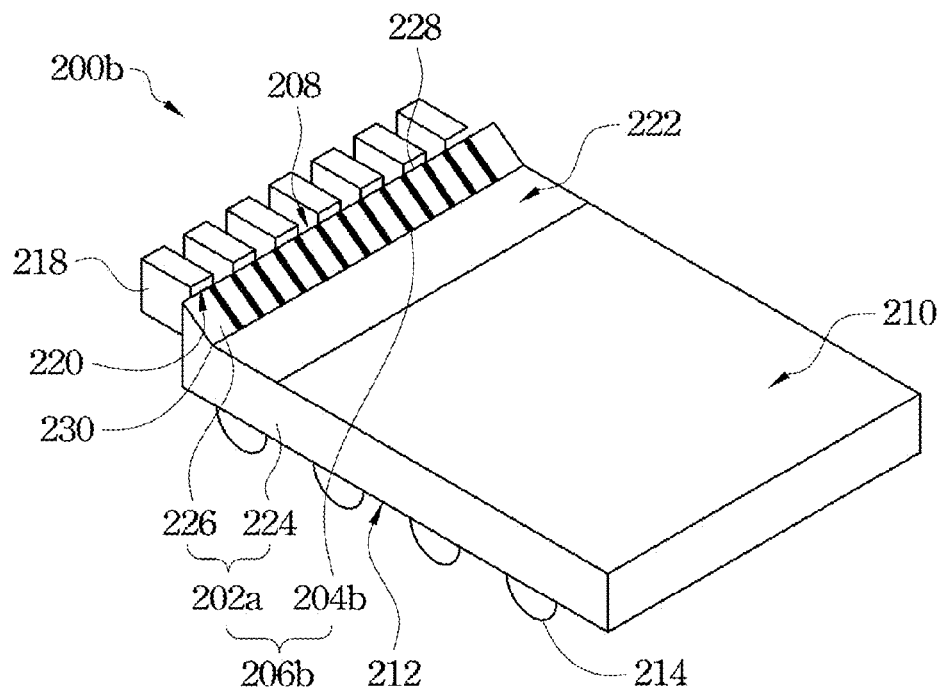
FIG. 6B illustrates a perspective view of a backlight module in accordance with still another embodiment of the present invention.
Figure 6C:
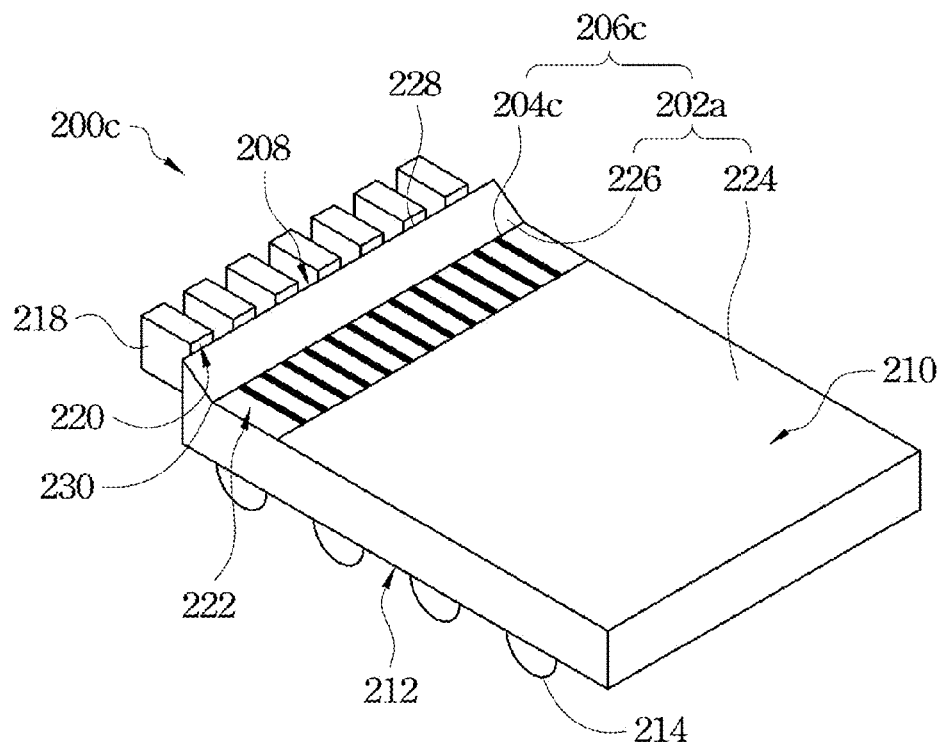
FIG. 6C illustrates a perspective view of a backlight module in accordance with yet another embodiment of the present invention.

The stripe microstructures of the present invention may not be distributed in the entire microstructure region. Refer to FIG. 6B and FIG. 6C. FIG. 6B and FIG. 6C respectively illustrate perspective views of backlight modules in accordance with another two embodiments of the present invention. Structures of backlight modules 200b and 200c are substantially the same as that of the backlight module 200a of the aforementioned embodiment, and differences among the structures of the backlight module 200a, 200b and 200c are that: stripe microstructures 204b of a light guide plate 206b of the backlight module 200b and the stripe microstructures 204c of a light guide plate 206c of the backlight module 200c are arranged in a portion of microstructure regions 222 respectively.

As shown in FIG. 6B, in the backlight module 200b, the stripe microstructures 204b of the light guide plate 206b only extend in the microstructure region 222 on the tapered portion 226 of the main body 202a. On the other hand, as shown in FIG. 6C, in the backlight module 200c, the stripe microstructures 204c of the light guide plate 206c only extend in the microstructure region 222 on the flat plate portion 224 of the main body 202a.

In the present invention, the microstructure region of the light-emitting surface of the main body of the light guide plate may be divided into several regions, and the regions may be set with stripe microstructures with different structure shapes, such as R-cut structures and V-cut structures. Or, the regions of the microstructure region may be set with stripe microstructures with a same structure shape but different central angles or flare angles. Certainly, the microstructure region of the light-emitting surface of the main body of the light guide plate may be set with stripe microstructures with a same structure shape and a same central angle or a same flare angle.

Figure 1:
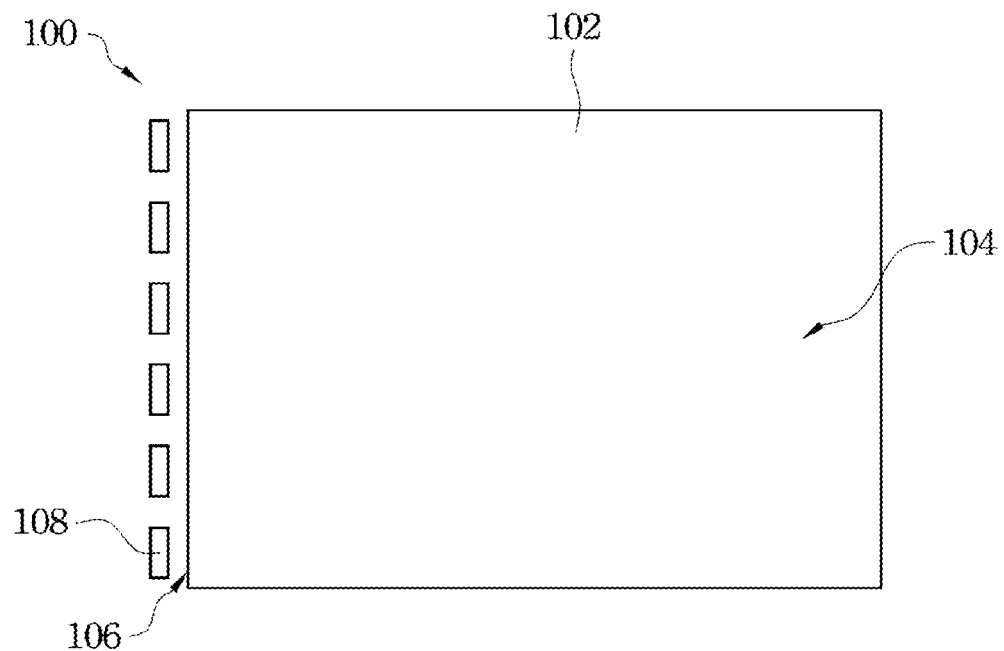
FIG. 1 illustrates a top view of an arrangement of a light guide plate and light-emitting diodes of a conventional backlight module.
Figure 2:
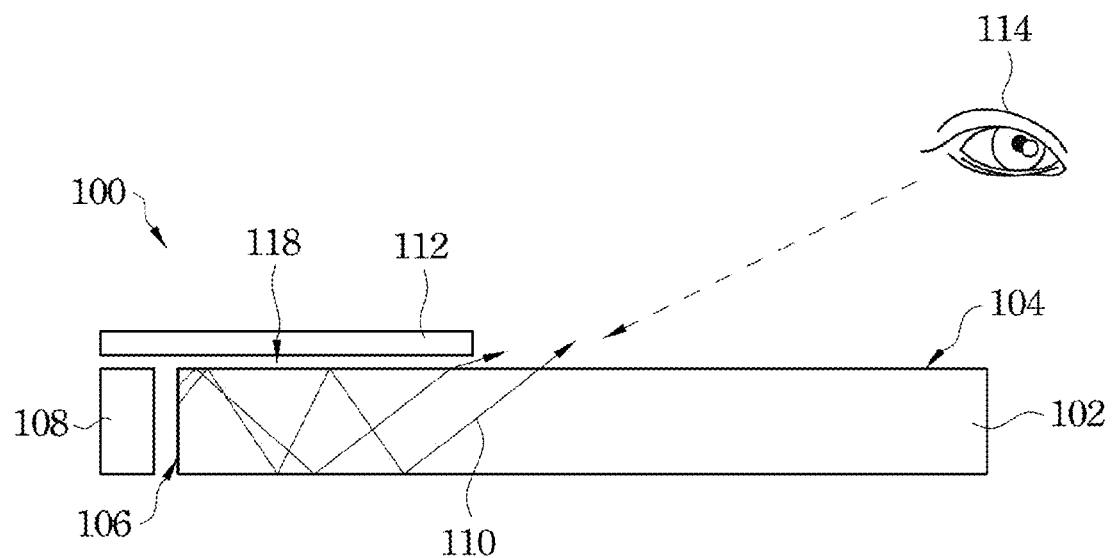
FIG. 2 illustrates a side view of the conventional backlight module.
Figure 3:
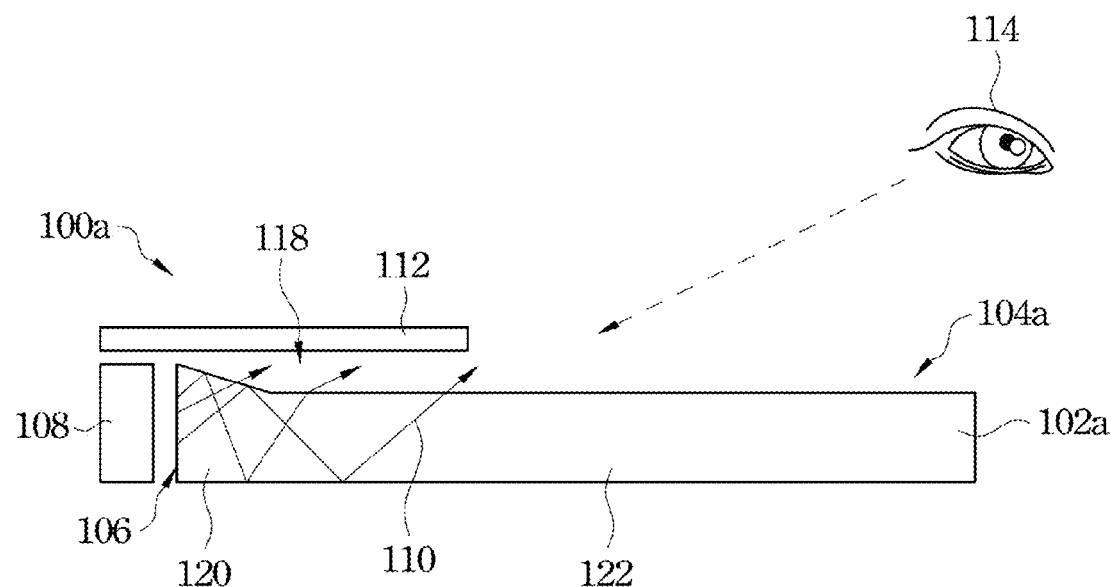
FIG. 3 illustrates a side view of another conventional backlight module.
Figure 4:
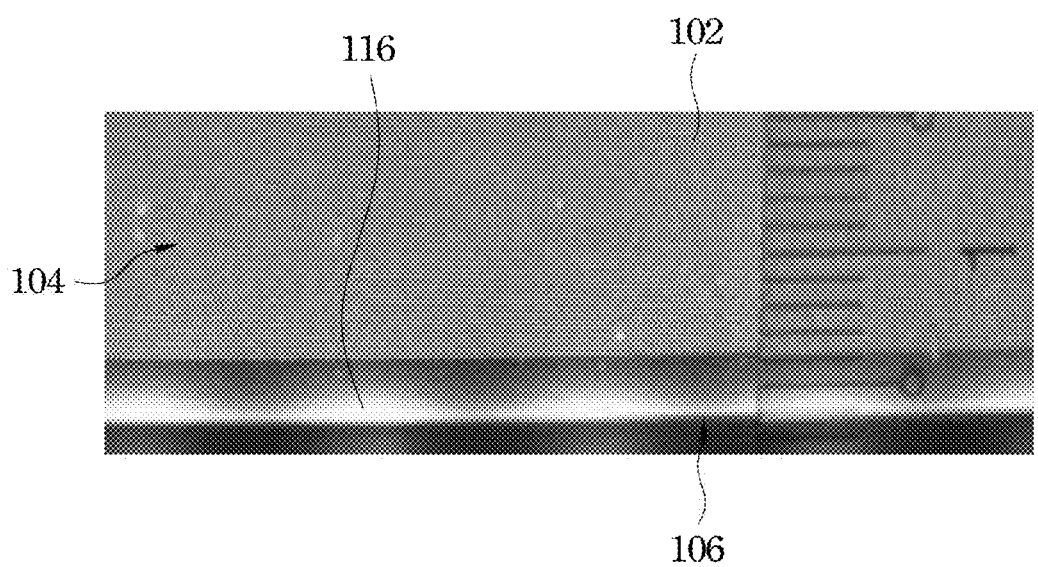
FIG. 4 is a diagram showing appearance brightness distribution on a light incidence side of a conventional backlight module.
Figure 7A:
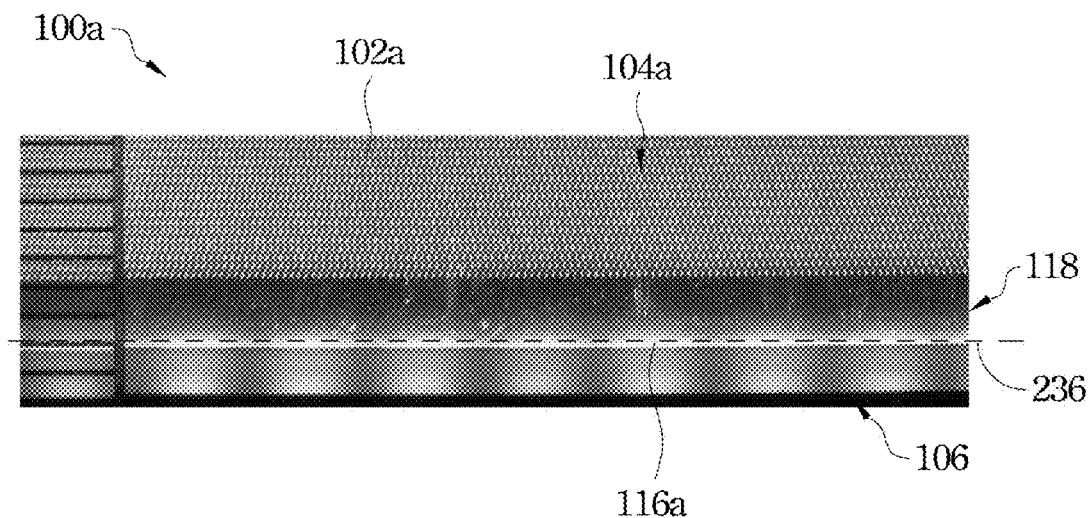
FIG. 7A is a diagram showing appearance brightness distribution on a light incidence side of the backlight module shown in FIG. 3.
Figure 7B:
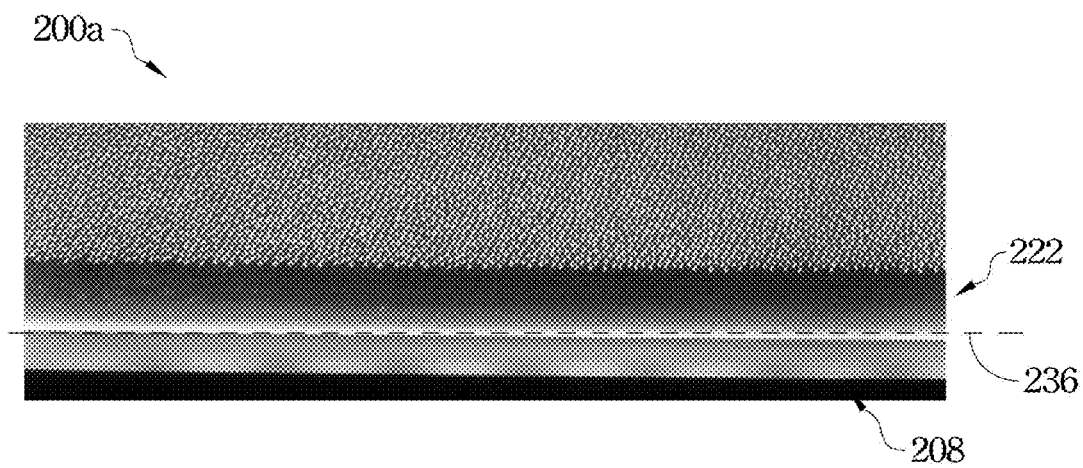
FIG. 7B is a diagram showing appearance brightness distribution on a light incidence side of the backlight module shown in FIG. 6A.
Figure 8:
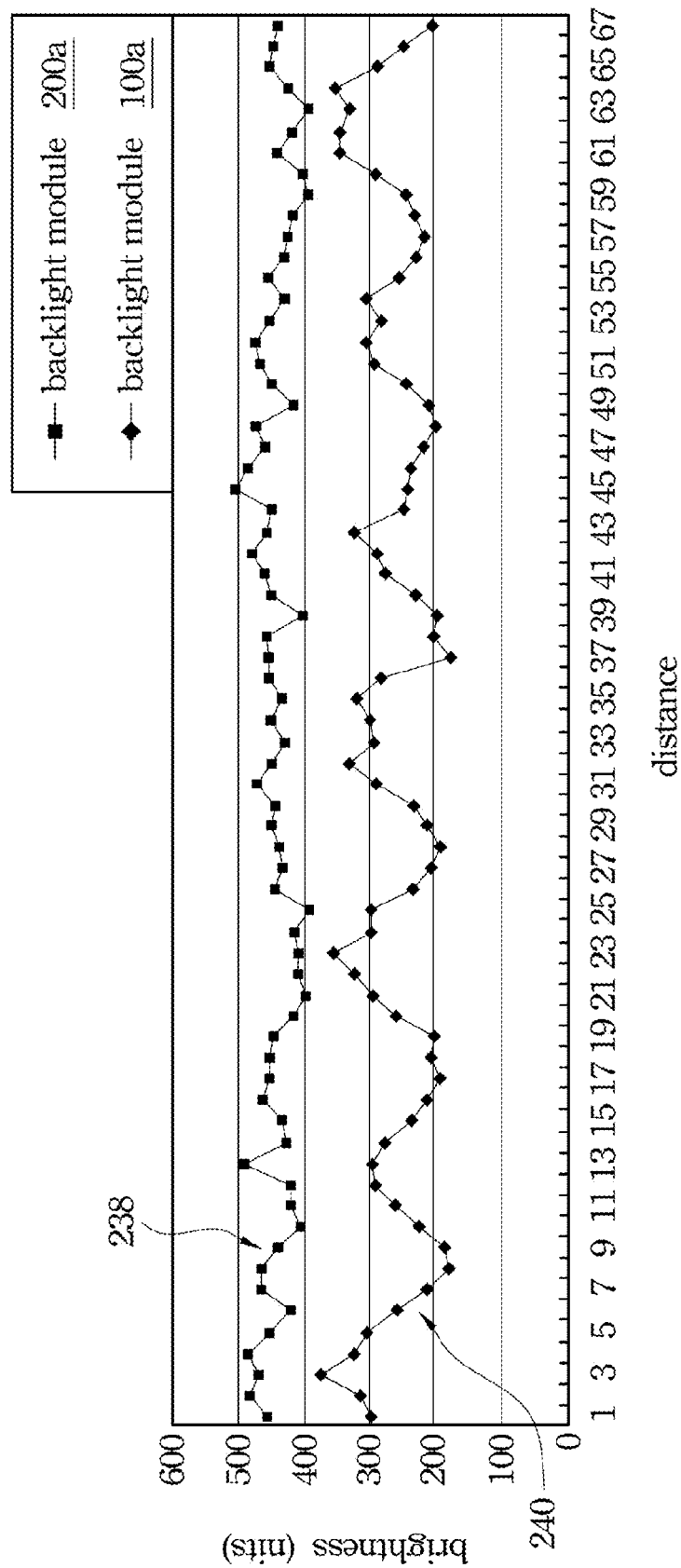
FIG. 8 is a diagram showing appearance brightness distribution curves on the incidence sides of the backlight modules shown in FIG. 7A and FIG. 7B.

Refer to FIG. 7A, FIG. 7B and FIG. 8. FIG. 7A, FIG. 7B and FIG. 8 are diagrams respectively showing appearance brightness distribution on a light incidence side of the backlight module shown in FIG. 3, appearance brightness distribution on a light incidence side of the backlight module shown in FIG. 6A, and appearance brightness distribution curves on the incidence sides of the backlight modules shown in FIG. 7A and FIG. 7B. According to FIG. 7A, it is known that the uneven brightness condition of the non-visible region 118 on the light incidence side of the conventional backlight module 100a is very serious, and the hot spots 116a are formed on the non-visible region 118. However, according to FIG. 7B, it is known that by arranging the stripe microstructures 204a parallel to the normal line of the light incidence surface 208 within the microstructure region 222 of the light-emitting surface 210 of the light guide plate 206a, the incident light of the non-visible region can be scattered, thereby can effectively blur the leakage light on the non-visible region. Accordingly, the brightness distribution of the microstructure region 222 of the backlight module 200a is obviously more uniform than that of the conventional backlight module 100a.

In addition, as shown in FIG. 8, according to the brightness distribution curves of the backlight modules 100a and 200a obtained along measure lines 236 in FIG. 7A and FIG. 7B, it is known that a brightness distribution curve 238 of the backlight module 200a is gentler, and the undulation of a brightness distribution curve 240 of the backlight module 100a is greater. It is also known that the brightness distribution of the microstructure region 222 of the backlight module 200a is more uniform than that of the conventional backlight module 100a.

Figure 9:
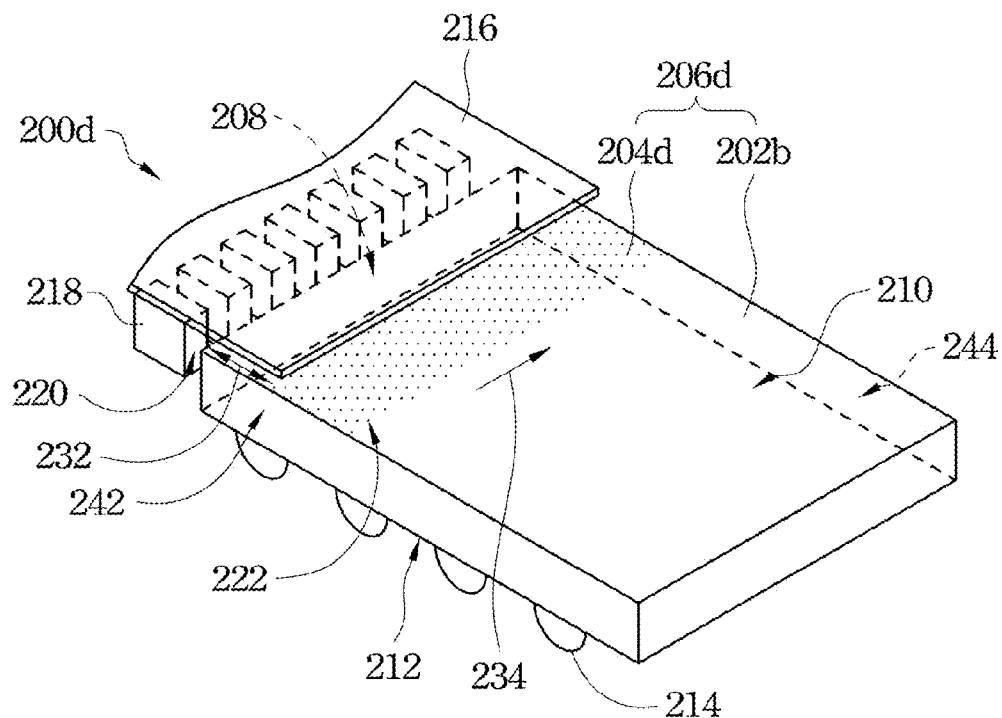
FIG. 9 illustrates a perspective view of a backlight module in accordance with further another embodiment of the present invention.

Refer to FIG. 9. FIG. 9 illustrates a perspective view of a backlight module in accordance with further another embodiment of the present invention. A structure of a backlight module 200d of the present embodiment is substantially the same as that of the backlight module 200 of the aforementioned embodiment, and differences between the two structures are that a main body 202b of a light guide plate 206d of the backlight module 200d includes a plurality of dot microstructures 204d rather than stripe microstructures 204; a microstructure region 222 of a light-emitting surface 210 of the main body 202b is separated from the light incidence surface 208 by a distance 232; and the backlight module 200d further includes a cover 216.

In the backlight module 200d, the main body 202b includes a first side surface 242 and a second side surface 244 opposite to each other. The first side surface 242, the light incidence surface 208 and the second side surface 244 are connected to three adjacent edges of the light-emitting surface 210 in sequence, i.e. the light incidence surface 208 is located between the first side surface 242 and the second side surface 244. In addition, the first side surface 242, the light incidence surface 208 and the second side surface 244 all are connected between the light-emitting surface 210 and the light reflective surface 212.

In the main body 202b, the microstructure region 222 extends from an edge of the light-emitting surface 210 connected with the first side surface 242 to another edge of the light-emitting surface 210 connected with the second side surface 244. In one exemplary example, a direction 234 of the microstructure region 222 extending on the light-emitting surface 210 from the first side surface 242 to the second side surface 244 may be perpendicular to the normal line of the light incidence surface 208. Furthermore, in one exemplary example, the distance 232 between the microstructure region 222 and the light incidence surface 208 may be greater than 0, and equal to or smaller than 20 mm, for example.

In the light guide plate 206d, the dot microstructures 204d are uniformly distributed in the whole microstructure region 222 of the light-emitting surface 210. In addition, the dot microstructures 204d may be dot diffusing structures with matted surfaces and not conoid surface structures. In some exemplary examples, the dot microstructures 204d may be sand blasting dot structures or laser dot structures formed by a sand blasting method or a laser method.

As shown in FIG. 5, the cover 216 may extend from the top of the light sources 218 to the top of the light-emitting surface 210 of the main body 202b of the light guide plate 206d, and may at least cover the light-emitting surface 220 of the light sources 218, the light incidence surface 208 of the main body 202b, and a portion of the light-emitting surface 210 near the light incidence surface 208. In one exemplary example, the cover 216 may cover a portion of the microstructure region 222. The cover 216 may have a reflection capability, and light emitted by the light sources 218 toward the cover 216 can be reflected to the light-emitting surface 210 of the main body 202b.

The emitting light of the point light sources, such as the light-emitting diodes, is highly directional and narrow, and by distributing the dot microstructures 204d in the whole microstructure region 222 of the light-emitting surface 210 of the main body 202b, the light reflected by the cover 216 toward the light-emitting surface 210 can be scattered. Therefore, a spray phenomenon caused by the point light sources with high directionality can be effectively blurred by the dot microstructures 204d. Accordingly, brightness on a light incidence side of the light guide plate 206d is uniformed to further uniform brightness of a light-emitting surface of the backlight module 200d.

Figure 10:
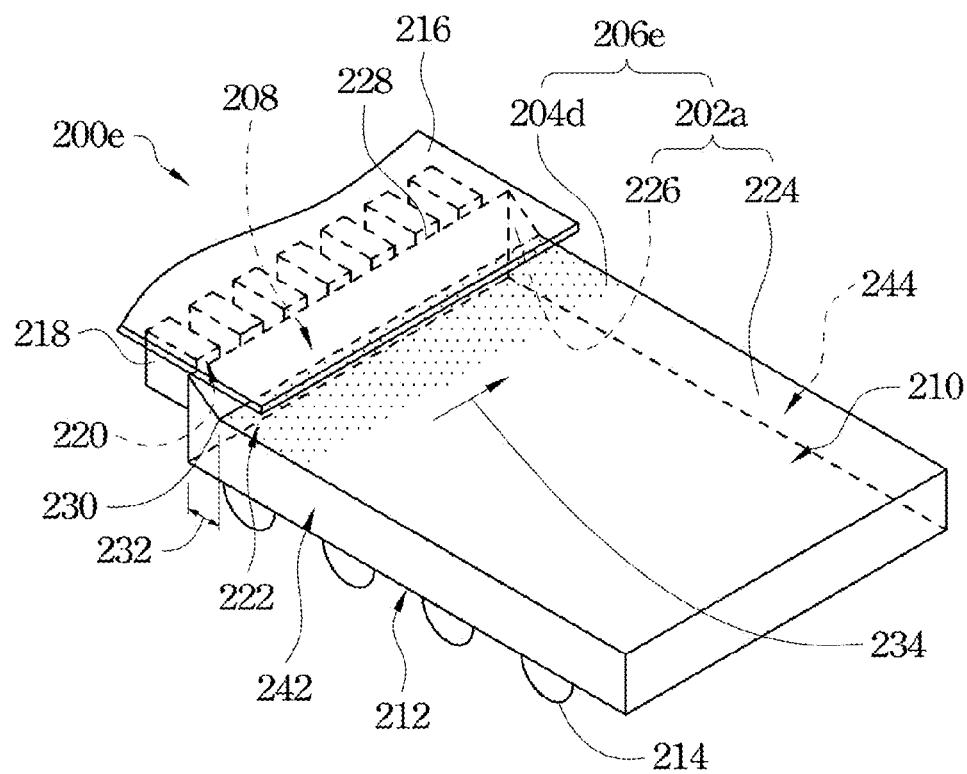
FIG. 10 illustrates a perspective view of a backlight module in accordance with still yet another embodiment of the present invention.

Refer to FIG. 10. FIG. 10 illustrates a perspective view of a backlight module in accordance with still yet another embodiment of the present invention. A structure of a backlight module 200e of the present embodiment is substantially the same as that of the backlight module 200d of the aforementioned embodiment, and a difference between the two structures is that a main body 202a of a light guide plate 206e of the backlight module 200e is not a flat plate with a uniform thickness.

In the backlight module 200e, the light guide plate 206e is similar to the light guide plate 206a shown in FIG. 6A, and includes a tapered portion 226 and the flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 is located on the flat plate portion 224 and does not extend to the tapered portion 226.

Figure 11:
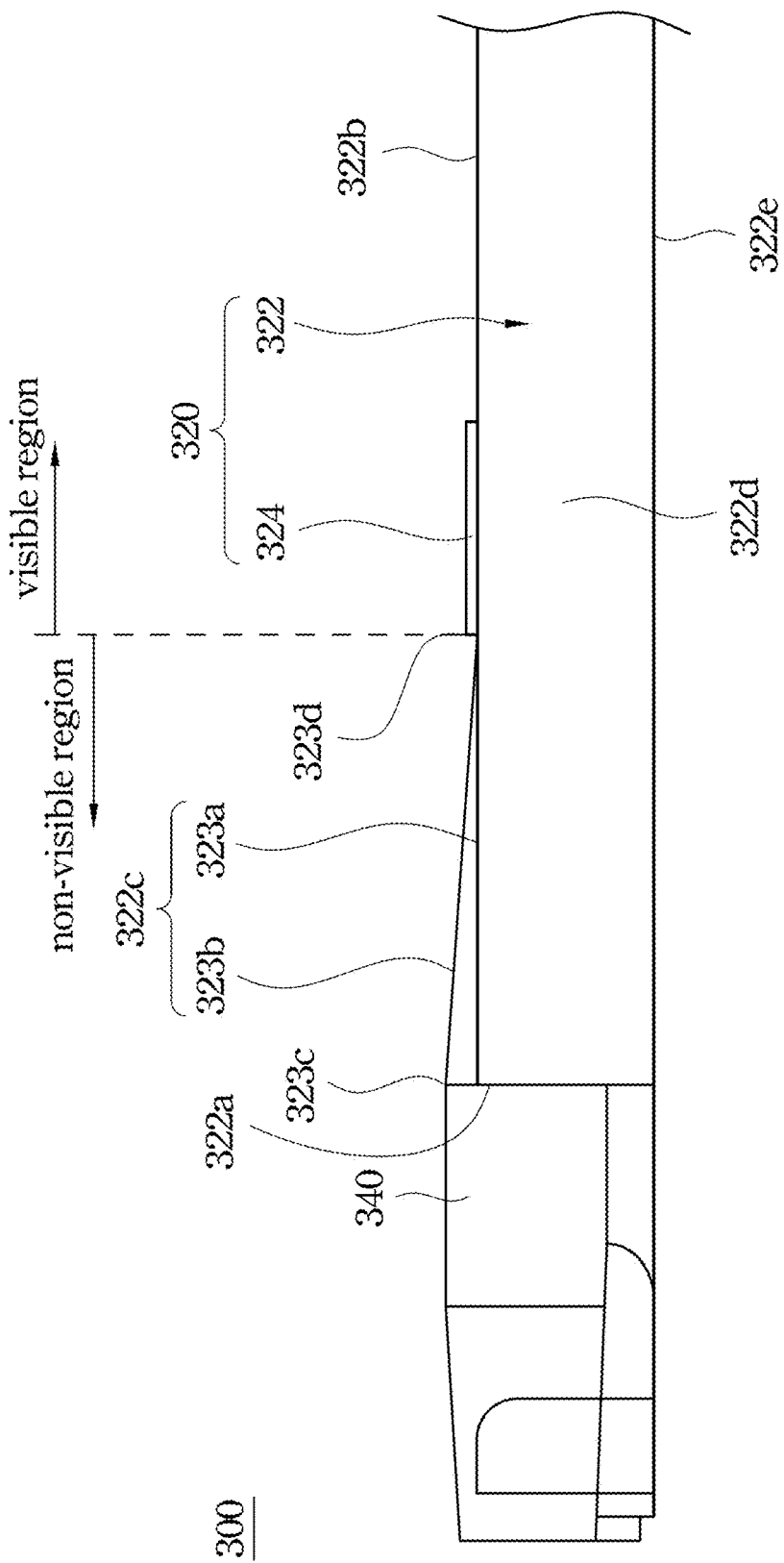
FIG. 11 illustrates a side view of a backlight module in accordance with still yet another embodiment of the present invention.
Figure 12:
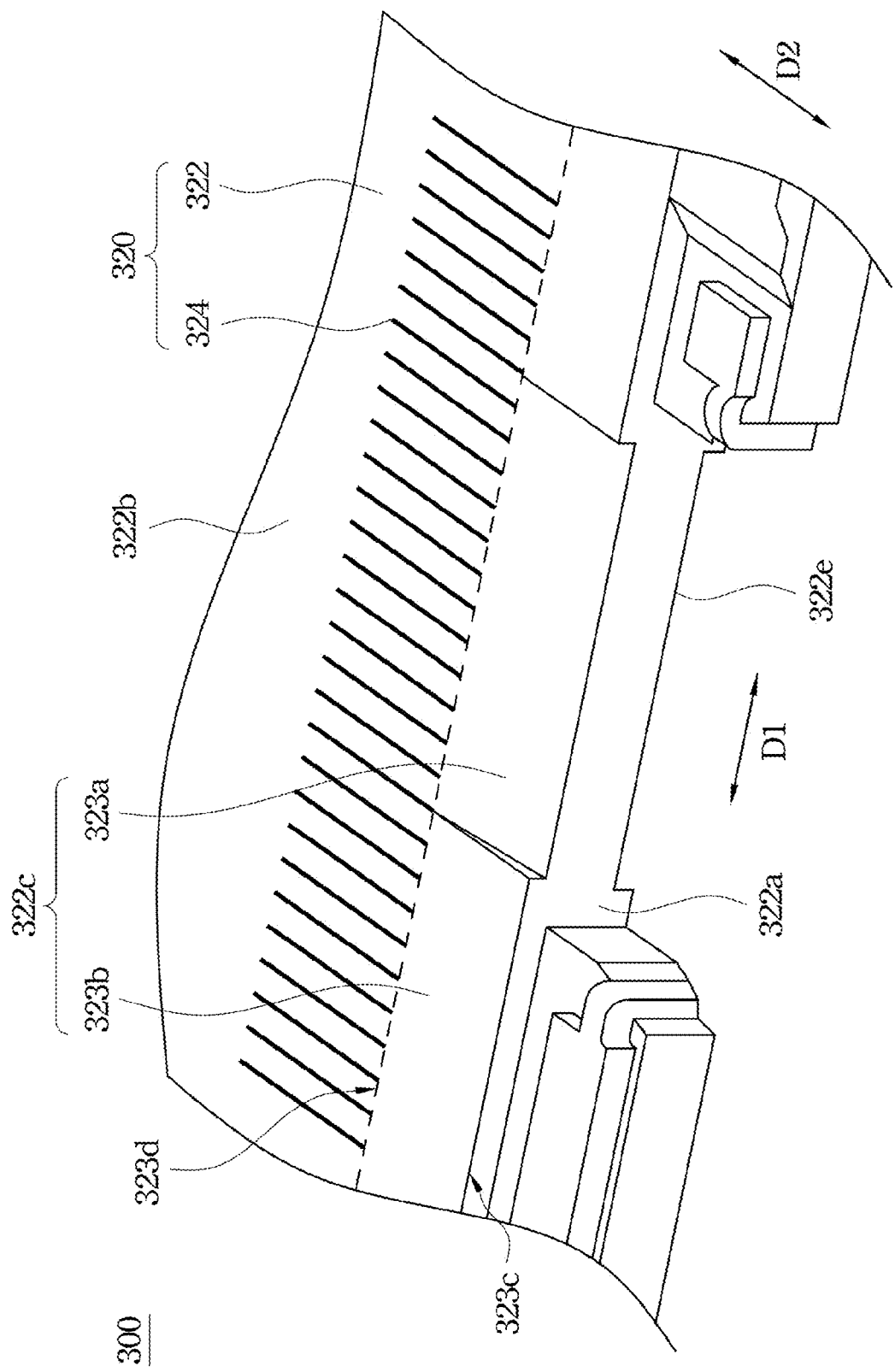
FIG. 12 illustrates a perspective view of the backlight module shown in FIG. 11.

Refer to FIG. 11 and FIG. 12. FIG. 11 and FIG. 12 respectively illustrate a side view of and a perspective view of a backlight module 300 in accordance with still yet another embodiment of the present invention. In the present embodiment, the backlight module 300 mainly includes a light guide plate 320 and various light sources 340. The light guide plate 320 includes a main body 322 and various stripe microstructures 324 disposed on the main body 322. The main body 322 includes a light incidence surface 322a, an optical surface 322b, a tapered portion 322c, and a flat plate portion 322d. The tapered portion 322c is adjacent to the light incidence surface 322a, and the optical surface 322b is located on the flat plate portion 322d. In the present embodiment, the optical surface 322b is a light-emitting surface. In other embodiments, the optical surface 322b is a reflecting surface.

Referring to FIG. 11 and FIG. 12 again, in the present embodiment, the stripe microstructures 324 are arranged on the main body 322. Moreover, at least portions of the stripe microstructures 324 are located at the optical surface 322b, and each of the stripe microstructures 324 is trimmed between the light incidence surface 322a and an opposite side of the main body 322. In one embodiment, a length of each of the stripe microstructures 324 is smaller than a length of the main body 322. As shown in FIG. 11 and FIG. 12, the tapered portion 322c has a first end 323c and a second end 323d opposite to each other. The thickness of the tapered portion 322c is gradually decreased from the first end 323c to the second end 323d, i.e. the first end 323c of the tapered portion 322c is thicker than the second end 323d. In addition, the tapered portion 322c includes a flat surface 323a and various inclined portions 323b. The inclined portions 323b are arranged on the flat surface 323a along a direction D1. The direction D1 is different from an extending direction D2 of the stripe microstructures 324. In one exemplary example, the direction D1 is vertical to the extending direction D2.

In the present embodiment, the main body 322 has a surface 322e opposite to the optical surface 322b. In the present embodiment, a distance between the flat surface 323a and surface 322e is equal to a distance between the surface 322e and the optical surface 322b. In the present embodiment, there are a first side edge and a second side edge respectively on a top and a bottom of the tapered portion 322c, and the first side edge is separated from the optical surface 322b. As shown in FIG. 11 and FIG. 12, each of the stripe microstructures 324 extends from the second side edge and trimmed between the light incidence surface 322a and an opposite side of the main body 322. In other words, one end of each of the stripe microstructures 324 is connected to the second side edge of the tapered portion 322c, and the other end of the stripe microstructures 324 is located on the optical surface 322b. In the present embodiment, as shown in FIG. 11, the backlight module 300 has a visible region and a non-visible region. The visible region is aligned with the second side edge of the tapered portion 322c, and each of the stripe microstructures 324 is located in the visible region and extends from the second side edge of the tapered portion 322c towards the opposite side of the main body 322.

Figure 13:
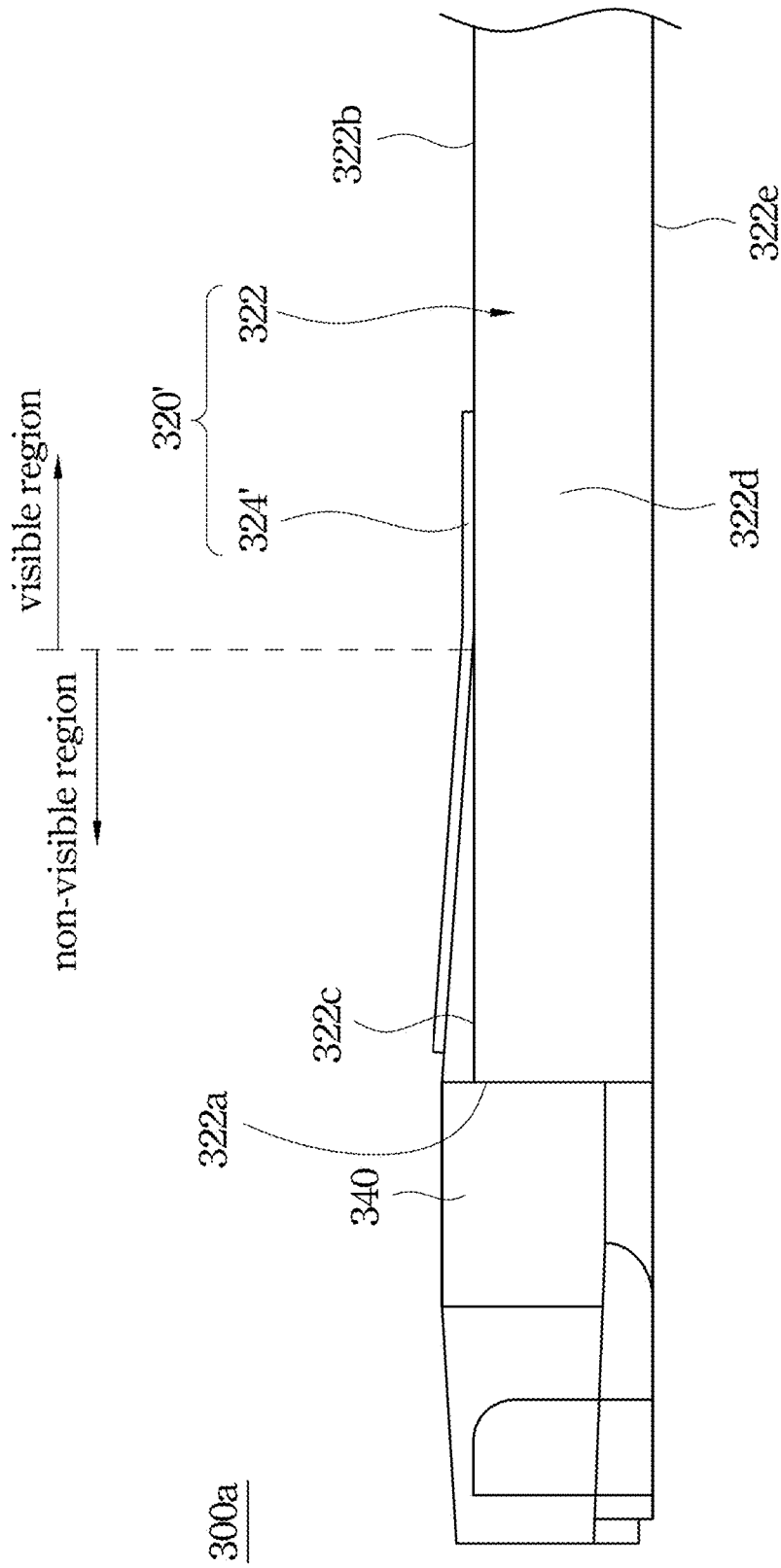
FIG. 13 illustrates a side view of a backlight module in accordance with still yet another embodiment of the present invention.

Refer to FIG. 13. FIG. 13 illustrates a side view of a backlight module 300a in accordance with still yet another embodiment of the present invention. A structure of the backlight module 300a of the present embodiment is substantially the same as that of the backlight module 300 of the aforementioned embodiment, and a difference between the two structures is that stripe microstructures 324' of a light guide plate 320' in the backlight module 300a extend from the tapered portion 322c until the stripe microstructures 324' are trimmed on the optical surface 322b between the light incidence surface 322a and an opposite side of the main body 322. In other words, one end of each of the stripe microstructures 324' is located on the tapered portion 322c, and the other end of the stripe microstructures 324' is located on the optical surface 322b. In the present embodiment, as shown in FIG. 13, the backlight module 300a has a visible region and a non-visible region. One portion of each of the stripe microstructures 324' which is located on the tapered portion is in the non-visible region, and the other portion of each of the stripe microstructures 324' which is located on the optical surface 322b is in the visible region.

Figure 14:
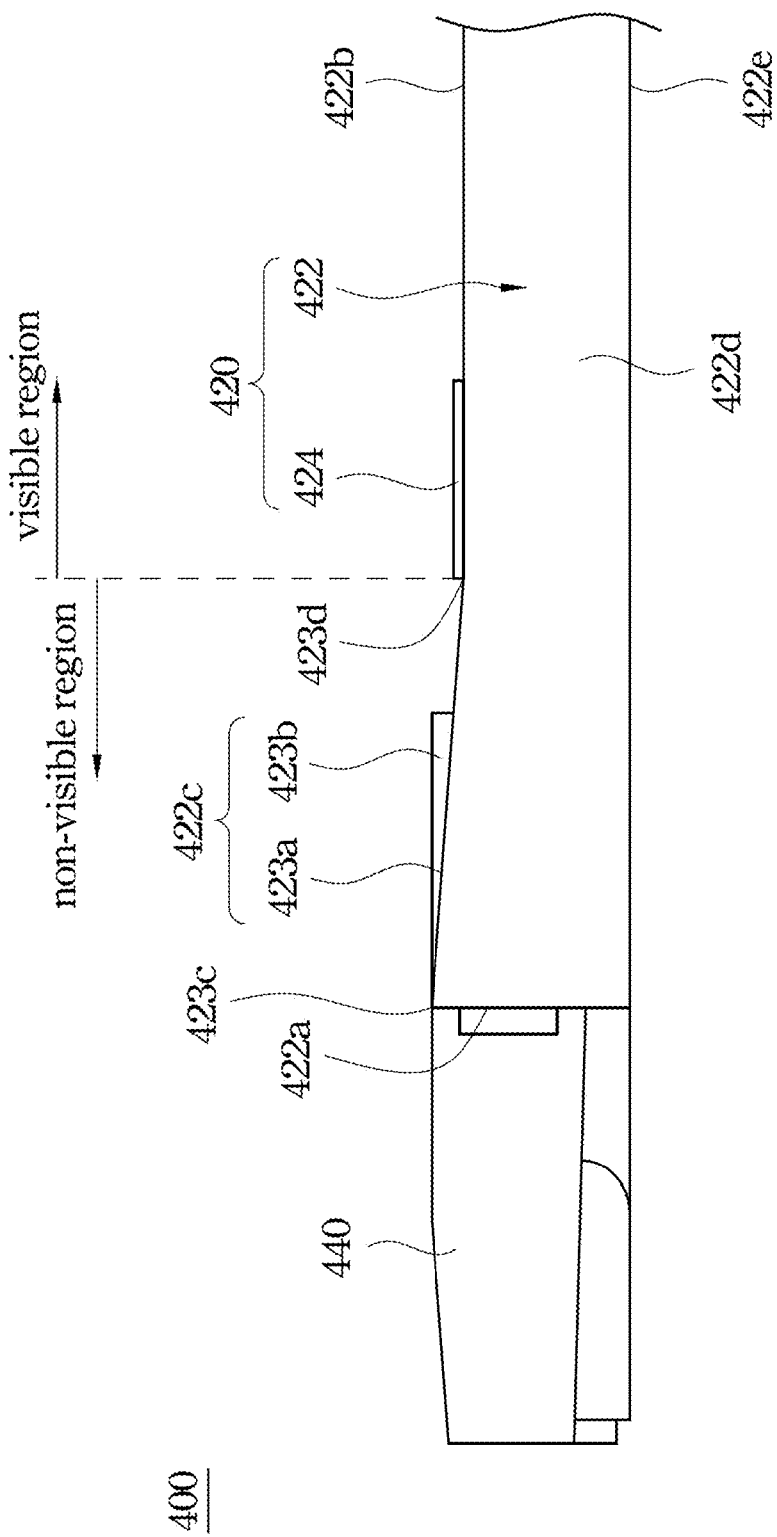
FIG. 14 illustrates a side view of a backlight module in accordance with still yet another embodiment of the present invention.
Figure 15:
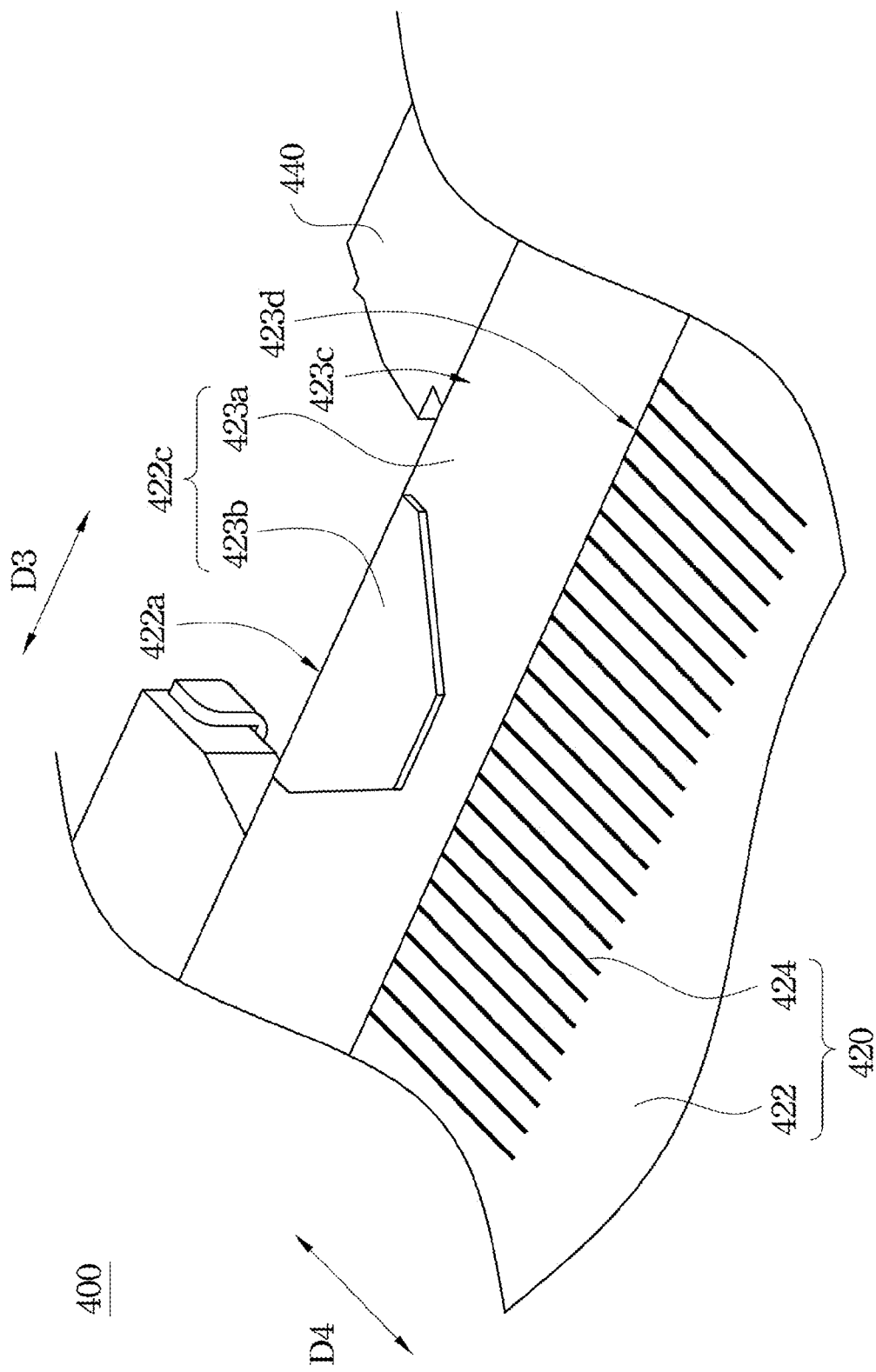
FIG. 15 illustrates a perspective view of the backlight module shown in FIG. 14.

Refer to FIG. 14 and FIG. 15. FIG. 14 and FIG. 15 respectively illustrate a side view of and a perspective view of a backlight module 400 in accordance with still yet another embodiment of the present invention. In the present embodiment, the backlight module 400 mainly includes a light guide plate 420 and various light sources 440. The light guide plate 420 includes a main body 422 and various stripe microstructures 424 disposed on the main body 422. The main body 422 includes a light incidence surface 422a, an optical surface 422b, a tapered portion 422c, and a flat plate portion 422d. The tapered portion 422c is adjacent to the light incidence surface 422a, and the optical surface 422b is located on the flat plate portion 422d. In the present embodiment, the optical surface 422b is a light-emitting surface. In other embodiments, the optical surface 422b is a reflecting surface.

Referring to FIG. 14 and FIG. 15 again, in the present embodiment, the stripe microstructures 424 are arranged on the main body 422. Moreover, at least portions of the stripe microstructures 424 are located at the optical surface 422b, and each of the stripe microstructures 424 is trimmed between the light incidence surface 422a and an opposite side of the main body 422. In one embodiment, a length of each of the stripe microstructures 424 is smaller than a length of the main body 322. As shown in FIG. 13 and FIG. 14, the tapered portion 422c has a first end 423c and a second end 423d opposite to each other. The thickness of the tapered portion 422c is gradually decreased from the first end 423c to the second end 423d, i.e. the first end 423c of the tapered portion 422c is thicker than the second end 423d. In addition, the tapered portion 422c includes an inclined surface 423a and various platforms 423b. The platforms 423b are arranged on the inclined surface 423a along a direction D3. The direction D3 is different from an extending direction D4 of the stripe microstructures 424. In one exemplary example, the direction D3 is vertical to the extending direction D4.

As shown in FIG. 14, in the present embodiment, the main body 422 has a surface 422e opposite to the optical surface 422b. In the present embodiment, a distance between a flat surface of the platforms 423b and surface 422e is greater than a distance between the surface 422e and the optical surface 422b. In the present embodiment, there are a first side edge and a second side edge respectively on a top and a bottom of the tapered portion 422c, and the flat surface of the platforms 423b is separated from the optical surface optical surface 422b, preferly, the surface of each platform 423b is parallel to the optical surface 422b of the main body 422. As shown in FIG. 14 and FIG. 15, each of the stripe microstructures 424 extends from the second side edge and trimmed between the light incidence surface 422a and an opposite side of the main body. In other words, one end of each of the stripe microstructures 424 is connected to the second side edge of the tapered portion 422c, and the other end of the stripe microstructures 424 is located on the optical surface 322b. In the present embodiment, as shown in FIG. 14, the backlight module 400 has a visible region and a non-visible region. Moreover, the whole portion of each of the stripe microstructures 424 is located in the visible region instead of extending towards the non-visible region.

Figure 16:
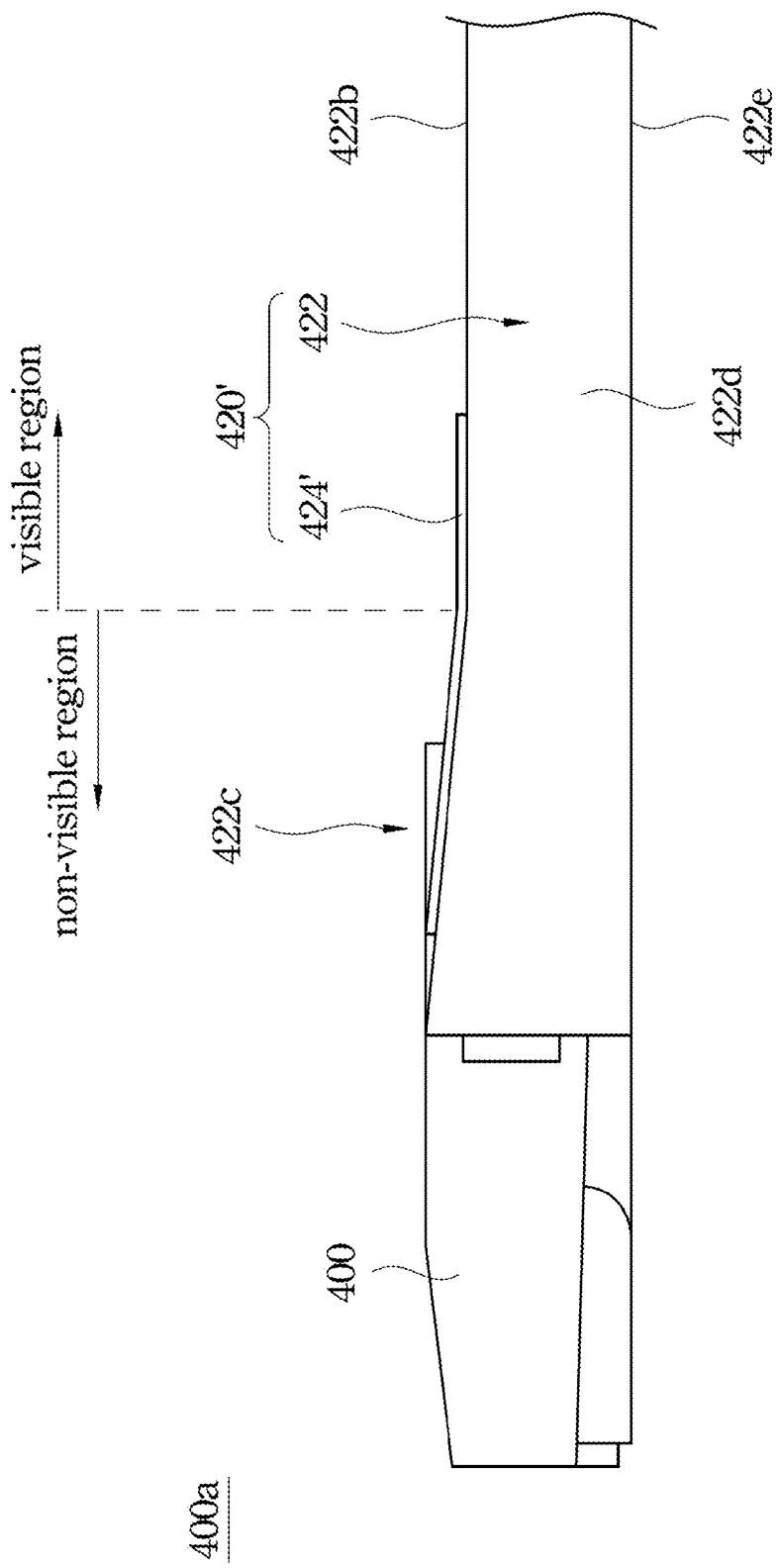
FIG. 16 illustrates a side view of a backlight module in accordance with still yet another embodiment of the present invention.

Refer to FIG. 16. FIG. 16 illustrates a side view of a backlight module 400a in accordance with still yet another embodiment of the present invention. A structure of the backlight module 400a of the present embodiment is substantially the same as that of the backlight module 400 of the aforementioned embodiment, and a difference between the two structures is that stripe microstructures 424' of a light guide plate 420' in the backlight module 400a extend from the tapered portion 422c until the stripe microstructures 424' are trimmed on the optical surface 422b between the light incidence surface 422a and an opposite side of the main body 422. In other words, one end of each of the stripe microstructures 424' is located on the tapered portion 422c, and the other end of the stripe microstructures 424' is located on the optical surface 422b. In the present embodiment, as shown in FIG. 16, the backlight module 400a has a visible region and a non-visible region. One portion of each of the stripe microstructures 424' which is located on the tapered portion is in the non-visible region, and the other portion of each of the stripe microstructures 424' which is located on the optical surface 422b is in the visible region.

In some embodiments, the stripe microstructures can be disposed according to the location of the visible region and the non-visible region of the backlight module. For example, as shown in FIG. 11 and FIG. 14, the visible region is aligned with the second side edge of the tapered portion 322c and 422c, and each of the stripe microstructures 324 and 424 extends from the second side edge of the tapered portion 322c and 422c. In other embodiments, the visible region can be separated from the tapered portion.

Figure 17:
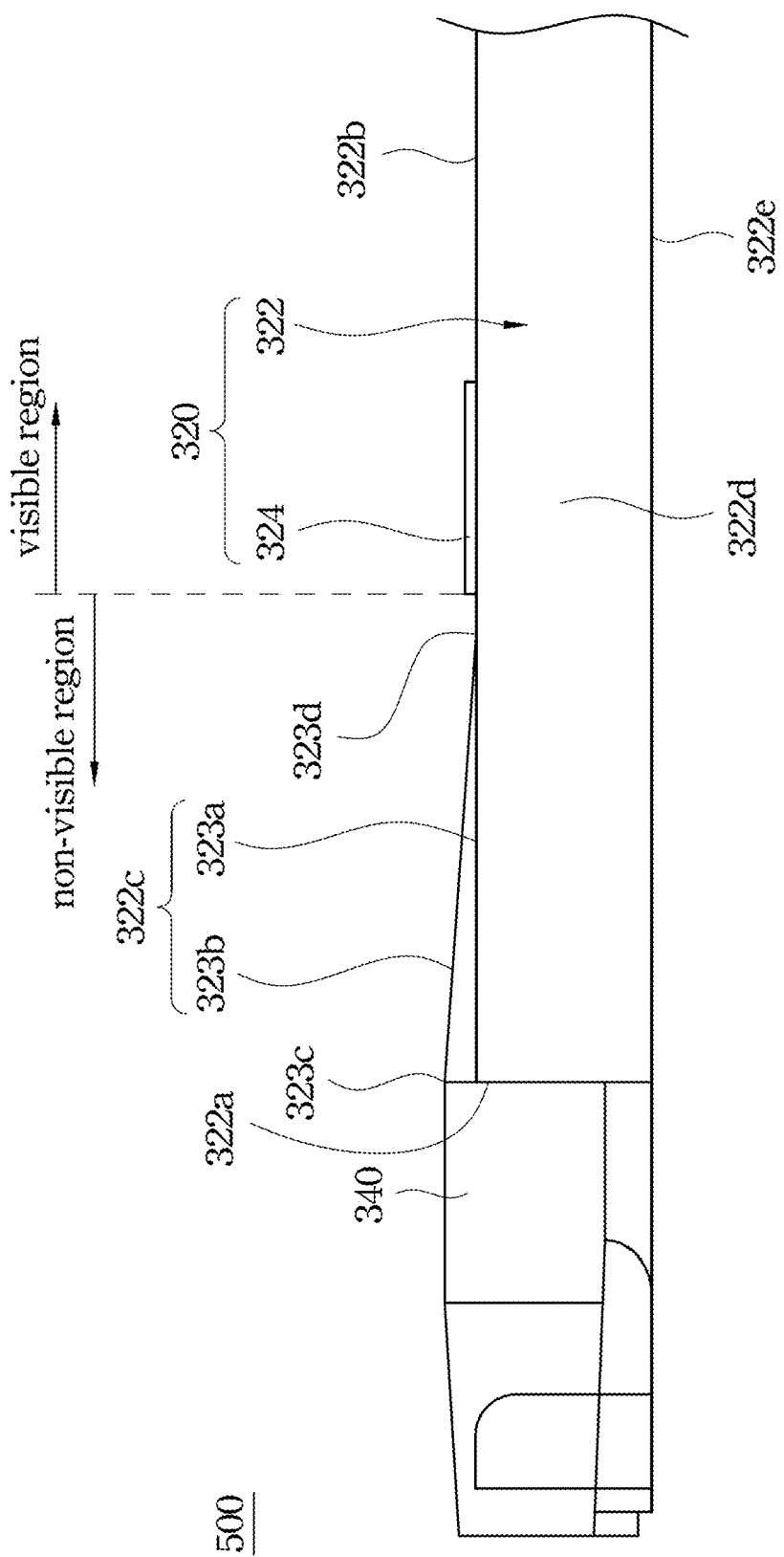
FIG. 17 illustrates a side view of a backlight module in accordance with still yet another embodiment of the present invention.
Figure 18:
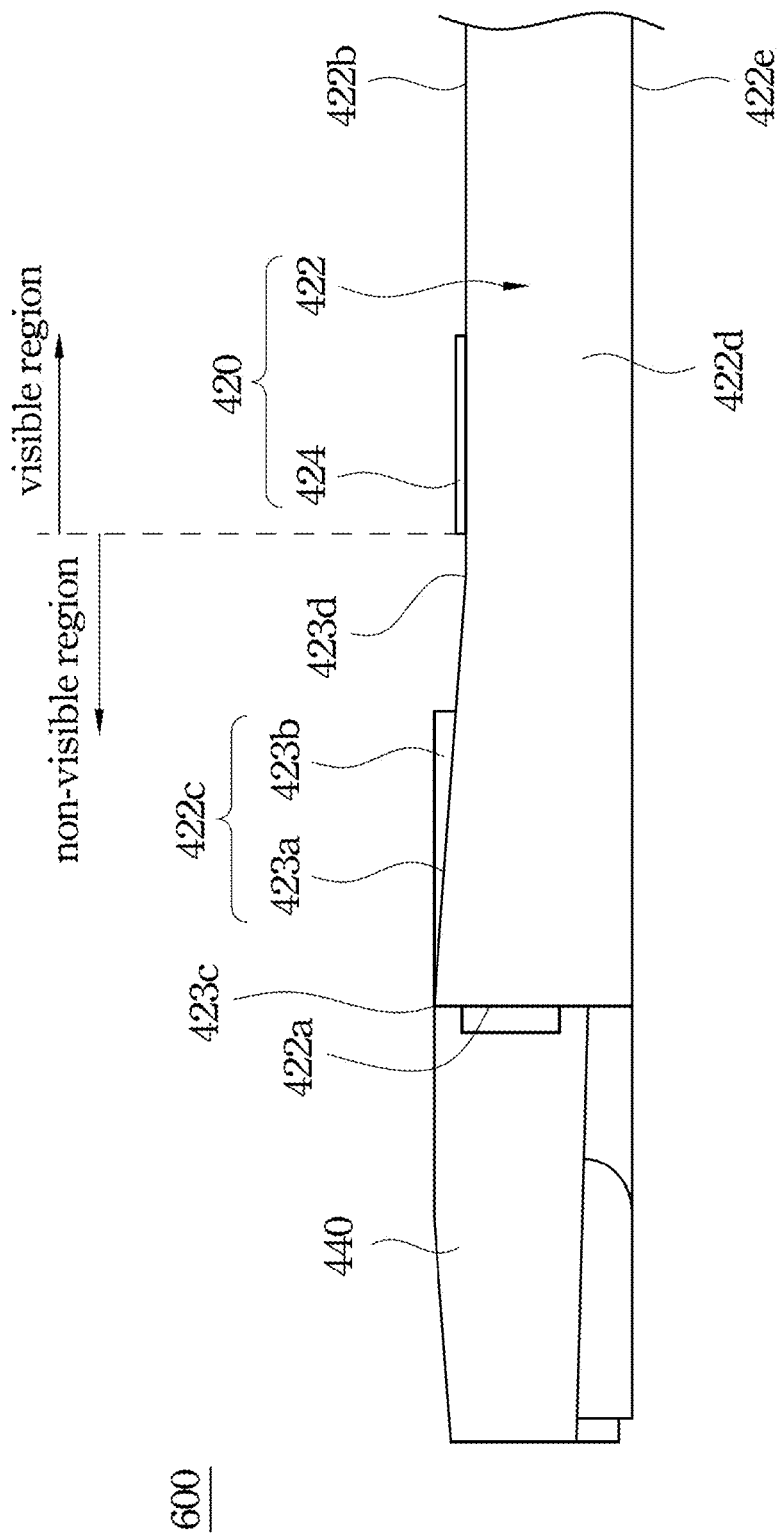
FIG. 18 illustrates a side view of a backlight module in accordance with still yet another embodiment of the present invention.

Referring to FIG. 17 and FIG. 18, FIG. 17 and FIG. 18 respectively illustrate two side views of two types of backlight modules 500 and 600 in accordance with still yet another embodiment of the present invention. As shown in FIG. 17, a structure of the backlight module 500 of the present embodiment is substantially the same as that of the backlight module 300 of the aforementioned embodiment, and a difference between the two structures is that the backlight modules 500 has a visible region a non-visible region, and the visible region is separated from the second end 323d of tapered portion 322c. In the present embodiment, each of the stripe microstructures 324 is separated from the second end 323d of the tapered portion 322c.

As shown in FIG. 18, a structure of the backlight module 600 of the present embodiment is substantially the same as that of the backlight module 400 of the aforementioned embodiment, and a difference between the two structures is that the backlight modules 600 has a visible region a non-visible region, and the visible region is separated from the second end 423d of tapered portion 422c. In the present embodiment, each of the stripe microstructures 424 is separated from the second end 423d of the tapered portion 422c.

Figure 19:
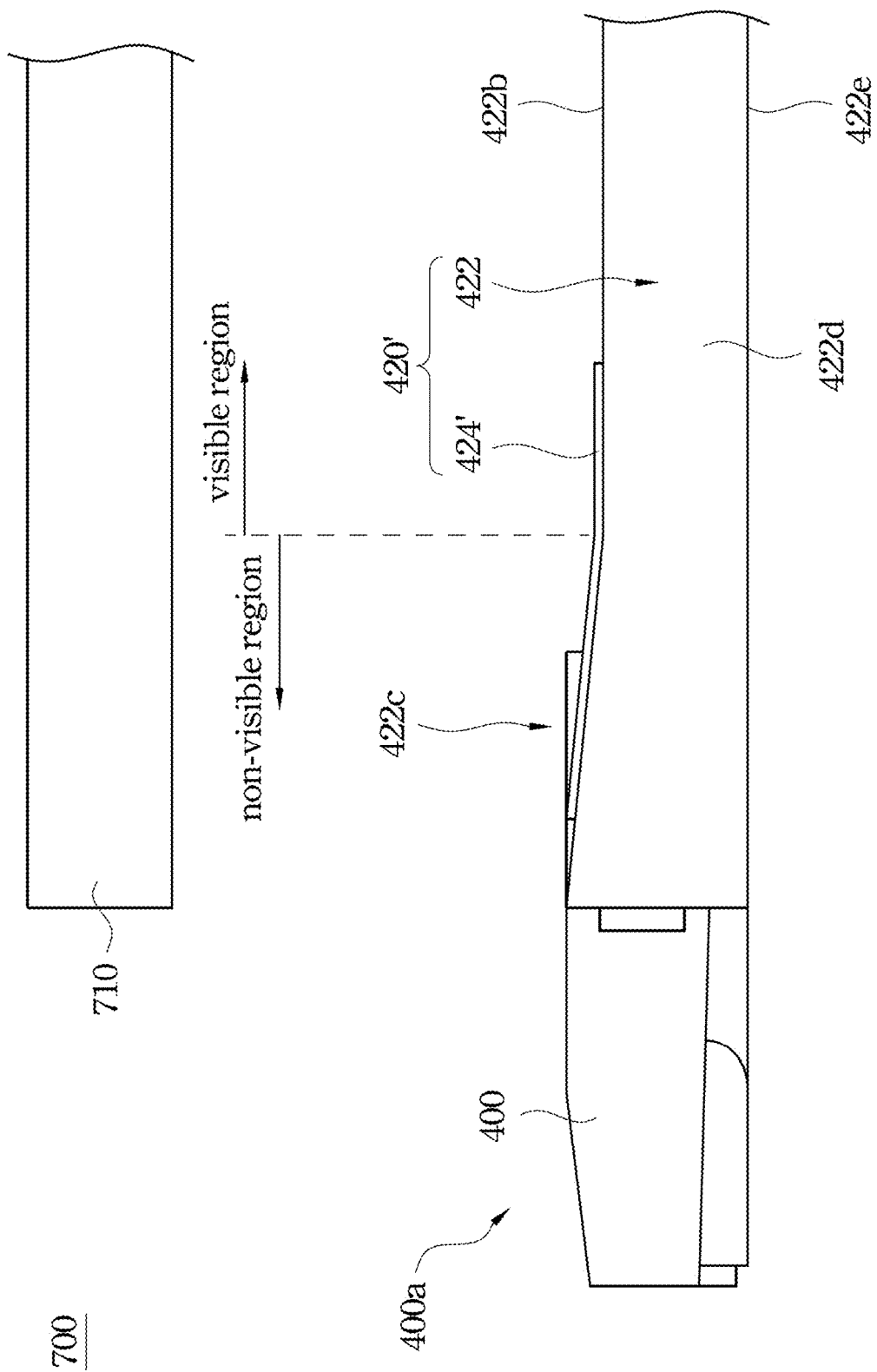
FIG. 19 illustrates a side view of a display device in accordance with still yet another embodiment of the present invention.

Referring to FIG. 19, FIG. 19 illustrates a side view of a display device 700 in accordance with still yet another embodiment of the present invention. The display device 700 in the present embodiment includes the backlight module 400a and a display panel 710. As shown in FIG. 19, the display panel 710 is disposed in front of the main body 422 of the light guide plate 420. Light beam emitted from optical surface 422b of the light guide plate 420 can enter the display panel 710, so as to achieve the aforementioned objects. It is noted that, the backlight module 400a is merely used as an example for explanation in the present embodiment. In other embodiments, other backlight modules as described above can be also applied to the display device 700.

According to the aforementioned embodiments of the present invention, advantages of the present invention are that a microstructure region of a light-emitting surface of a light guide plate near a light incidence surface is set with a plurality of stripe microstructures, which are parallel to a normal line of the light incidence surface, and the stripe microstructures can scatter incident light of a non-visible region, so that leakage light on the non-visible region can be effectively blurred to greatly improve an uneven brightness phenomenon in the non-visible region. Therefore, brightness uniformity of the backlight module can be enhanced.

According to the aforementioned embodiments of the present invention, another advantage of the present invention is that many dot microstructures are distributed in a microstructure region of a light guide plate near a light incidence surface and lengthwise crossing a light-emitting surface. The dot microstructures can blur light reflected back to a light-emitting surface of the light guide plate, so that a spray phenomenon caused by point light sources with high directionality can be greatly improved.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A light guide plate, comprising:
a main body comprising a light incidence surface, an optical surface, a tapered portion and a flat plate portion, wherein the tapered portion is adjacent to the light incidence surface, and the tapered portion has a first end and a second end opposite to each other, and a thickness of the first end is larger than a thickness of the second end, wherein the flat plate portion extends from the second end along a normal line of the light incidence surface, and a thickness of the flat plate portion is equal to the thickness of the second end; and
a plurality of stripe microstructures arranged on the main body, wherein at least one portion of each of the stripe microstructures is located at the optical surface, and trimmed between the light incidence surface and an opposite side of the main body, wherein the portion of each of the stripe microstructures located at the optical surface is parallel to a normal line of the light incidence surface, and a length of each of the stripe microstructures is smaller than a length of the main body.

2. The light guide plate according to claim 1, wherein the stripe microstructures are separated from the tapered portion.

3. The light guide plate according to claim 1, wherein
the tapered portion further comprises an inclined surface and a plurality of platforms arranged on the inclined surface, the inclined surface is connected to the optical surface, and each of the platforms has a flat surface; and
each flat surface is separated from the optical surface.

4. The light guide plate according to claim 1, wherein
the tapered portion further comprises a flat surface and a plurality of inclined portions arranged on the flat surface, and the flat surface is connected to the optical surface; and
the tapered portion has a first side edge and a second side edge respectively on a top and a bottom of the tapered portion, and the first side edge is separated from the optical surface.

5. The light guide plate according to claim 1, wherein the stripe microstructures are a plurality of V-cut structures and/or a plurality of R-cut structures.

6. A backlight module, comprising
a light guide plate as claimed in claim 1; and
a plurality of light sources disposed adjacent to the light incidence surface of the light guide plate.

7. A display device, comprising
a light guide plate as claimed in claim 1;
a plurality of light sources disposed adjacent to the light incidence surface of the light guide plate; and
a display panel disposed in front of the main body of the light guide plate.

8. A light guide plate, comprising:
a main body comprising a light incidence surface, an optical surface and a tapered portion wherein the tapered portion is adjacent to the light incident surface and has a first side edge and a second side edge respectively on a top and a bottom of the tapered portion; and
a plurality of stripe microstructures distributed on the main body and extending from the second side edge towards a direction away from the light incidence surface of the main body and trimmed between the light incidence surface and an opposite side of the main body, wherein a length of each of the stripe microstructures is smaller than a length of the main body.

9. The light guide plate according to claim 8, wherein
the tapered portion further comprises an inclined surface and a plurality of platforms arranged on the inclined surface, the inclined surface is connected to the optical surface, and each of the platforms has a flat surface; and
each flat surface is separated from the optical surface.

10. The light guide plate according to claim 8, wherein
the tapered portion further comprises a flat surface and a plurality of inclined portions arranged on the flat surface, and the flat surface is connected to the optical surface; and
the first side edge is separated from the optical surface.

11. The light guide plate according to claim 8, wherein the stripe microstructures are a plurality of V-cut structures and/or a plurality of R-cut structures.

12. The light guide plate according to claim 8, wherein
the tapered portion of the main body has a first end and a second end opposite to each other, wherein a thickness of the first end is larger than a thickness of the second end; and the main body further comprises a flat plate portion extending from the second end along a normal line of the light incidence surface, and a thickness of the flat plate portion is equal to the thickness of the second end.

13. A backlight module, comprising
a light guide plate as claimed in claim 8; and
a plurality of light sources disposed adjacent to the light incidence surface of the light guide plate.

14. A display device, comprising
a light guide plate as claimed in claim 8;
a plurality of light sources disposed adjacent to the light incidence surface of the light guide plate; and
a display panel disposed in front of the main body of the light guide plate.

15. A light guide plate, comprising:
a main body comprising a light incidence surface, an optical surface and a tapered portion, wherein the tapered portion is adjacent to the light incident surface; and
a plurality of stripe microstructures extended from the tapered portion until being trimmed on the optical surface between the light incidence surface and an opposite side of the main body, wherein one portion of each of the stripe microstructures is on the tapered portion, the other portion of each of the stripe microstructures is parallel to a normal line of the light incidence surface, and a length of each of the stripe microstructures is smaller than a length of the main body.

16. The light guide plate according to claim 15, wherein
the tapered portion further comprises an inclined surface and a plurality of platforms arranged on the inclined surface, the inclined surface is connected to the optical surface, and each of the platforms has a flat surface; and
each flat surface is separated from the optical surface.

17. The light guide plate according to claim 15, wherein
the tapered portion further comprises a flat surface and a plurality of inclined portions arranged on the flat surface, and the flat surface is connected to the optical surface; and the tapered portion has a first side edge and a second side edge respectively on a top and a bottom of the tapered portion, and the first side edge is separated from the optical surface.

18. The light guide plate according to claim 15, wherein
the stripe microstructures are a plurality of V-cut structures and/or a plurality of R-cut structures.

19. The light guide plate according to claim 15, wherein
the tapered portion of the main body has a first end and a second end opposite to each other, wherein a thickness of the first end is larger than a thickness of the second end; and the main body further comprises a flat plate portion extending from the second end along a normal line of the light incidence surface, and a thickness of the flat plate portion is equal to the thickness of the second end.

20. A backlight module, comprising
a light guide plate as claimed in claim 15; and
a plurality of light sources disposed adjacent to the light incidence surface of the light guide plate.

21. A display device, comprising
a light guide plate as claimed in claim 15;
a plurality of light sources disposed adjacent to the light incidence surface of the light guide plate; and
a display panel disposed in front of the main body of the light guide plate.

* * * * *